United States Patent [19]

Daamen et al.

[11] Patent Number: 4,888,319

[45] Date of Patent: Dec. 19, 1989

[54] SILICA-ALUMINA EXTRUDATES

[75] Inventors: Jacobus T. Daamen; Tom Huizinga, both of Amsterdam, Netherlands

[73] Assignee: Shell Oil Company, Houston, Tex.

[21] Appl. No.: 256,012

[22] Filed: Oct. 11, 1988

[30] Foreign Application Priority Data

Oct. 19, 1987 [GB] United Kingdom ............... 8724436

[51] Int. Cl.$^4$ .................... B01J 21/12; B01J 21/00
[52] U.S. Cl. .................... 502/235; 502/238; 502/242; 502/263
[58] Field of Search .................... 502/238, 263, 238

[56] References Cited

U.S. PATENT DOCUMENTS

| | | | |
|---|---|---|---|
| 2,348,072 | 5/1944 | Kanbofer | 502/238 |
| 2,480,669 | 8/1949 | Payne et al. | 502/263 |
| 3,346,509 | 10/1967 | Stewart | 502/238 |
| 3,390,100 | 6/1968 | Chomitz et al. | 502/263 |
| 3,519,574 | 7/1970 | Colgan | 502/263 |
| 4,039,474 | 8/1977 | Feistel et al. | 502/238 |
| 4,174,301 | 11/1979 | Choca et al. | 502/263 |
| 4,256,682 | 3/1981 | Denton | 502/232 |
| 4,482,642 | 11/1984 | Ettlinger et al. | 502/263 |
| 4,582,815 | 4/1986 | Bowes | 502/64 |

*Primary Examiner*—Carl F. Dees

[57] ABSTRACT

The invention relates to a process for the preparation of a shapable dough which comprises mixing and kneading a particulate silica-alumina with water and with an alkanolamine or ammonia to obtain a mixture having a total solids content of from 25 to 60% by weight, the alkanolamine or ammonia being present in an amount of from 0.5 to 20% by weight on the total solids content of the mixture, to a shapable dough obtained by this process, to the preparation of silica-alumina extrudates therefrom and to their use as catalyst carriers in hydrocarbon conversion or hydrocarbon synthesis reactions.

13 Claims, No Drawings

SILICA-ALUMINA EXTRUDATES

FIELD OF THE INVENTION

The invention relates to the preparation of silica-alumina extrudates, to the preparation of a shapable dough for silica-alumina extrudates, to a shapable dough for silica-alumina extrudates and to the preparation of calcined silica-alumina extrudates and to their use.

BACKGROUND OF THE INVENTION

In U.S. Pat. No. 4,582,815, issued Apr. 15, 1986, is disclosed a method for the preparation of a silica extrudate whereby a particulate silica is mixed with water and an alkali metal compound to prepare a mixture which is extruded. However, the use of an alkali metal makes it necessary that the extruded silica must be soaked in a solution of ammonium nitrate and nitric acid to remove the alkali metal. The same applies to silicas containing another refractory oxide, such as alumina, according to the above-mentioned U.S. Pat. No. 4,582,815.

Applicant has found that this purification process may be obviated by using an alkanolamine or ammonia in the preparation of a dough from which silica-alumina extrudates can be obtained.

SUMMARY OF THE INVENTION

The invention relates to a process for the preparation of a shapable dough which comprises mixing and kneading a particulate silica-alumina with water and with an alkanolamine or ammonia to obtain a mixture having a total solids content of from 25 to 60% by weight, the alkanolamine or ammonia being present in an amount of from 0.5 to 20% by weight on the total solids content of the mixture.

The invention further relates to a process for the preparation of silica-alumina extrudates which comprises mixing and kneading a particulate silica-alumina with water and with an alkanolamine or ammonia to obtain a mixture having a total solids content of from 25 to 60% by weight, the alkanolamine or ammonia being present in an amount of from 0.5 to 20% by weight on the total solids content of the mixture and extruding the mixture.

The invention further relates to a process for manufacturing calcined silica-alumina extrudates which comprises extruding a shapable dough into silica-alumina extrudates and drying and calcining the silica-alumina extrudates to a final temperature of between 300° C. and 1000° C., and to calcined silica-alumina extrudates obtained by this process.

DESCRIPTION OF THE PREFERRED EMBODIMENTS

The silica-alumina to be used in the process according to our invention is silica-alumina obtained by reacting a silicate, preferably sodium- or potassium silicate, with an acid in the presence of an aluminium compound. Preferred is the washed silica-alumina filter cake.

When silica-alumina gel is gradually heated to a higher temperature it loses water. Heating during longer times above 100° C. results in that the water content decreases to about 5% by weight. The water content of the silica-alumina is determined by weight loss on ignition (LOI). A sample is weighed and then placed in a muffle furnace where it is heated at 1000° C. for 2 hours. After heating the sample is again weighed. The difference in weights represents the LOI or the amount of water present in the silica-alumina. When silica-alumina has been calcined, at e.g. 500° C., it seems less suitable for use in the extrusion process. However silica-alumina gels which have been spray dried are very suitable.

The total solids content of the mixture of silica-alumina, ammonia or alkanolamine and water ranges from 25 to 60% by weight, preferably from 30 to 45% by weight and more preferably from 35 to 40% by weight, in order to obtain an extrudable mixture.

The amount of alkanolamine or ammonia ranges from 0.5 to 20% by weight, preferably from 2 to 15% by weight, more preferably from 3 to 10% by weight calculated on the total solids content.

To improve the flux properties in the extruder the mixture may also comprise a polyelectrolyte, such as Nalco 7879 (obtained from Nalco). The mixture (with or without polyelectrolyte) can readily be extruded e.g. over the metal die-plate of the Bonnot-extruder. Cylindrical extrudates can be prepared, but other forms may be prepared as well, such as mentioned in U.S. Pat. No. 4,028,227. It is possible to prepare silica-alumina with a surface area of more than 350 m$^2$/g.

The alkanolamines to be used in the process according to the invention may be mono-, di- or trialkanolamines. Preferred are monoalkanolamines, such as those containing 2 to 10 carbon atoms, e.g. ethanolamine, propanolamine, hexanolamine, nonanolamine and decanolamine. Other examples are diethanolamine and triethanolamine.

It is possible prior to extrusion to admix titanium dioxide or zirconium dioxide to the composition. This is advantageous when the silica-alumina is used as carrier and the titanium and zirconium are the effective catalyst ingredients.

The extruded silica-aluminas may be suitably used, for example, as carriers for catalysts, which are normally used in hydrocarbon conversion, like hydrodemetallization of heavy hydrocarbon oils, in hydrocarbon synthesis reactions, in the epoxidation of olefinically unsaturated compounds with organic hydroperoxides, in the hydrations of olefinically unsaturated compounds to produce the corresponding alkanols and in the purification of exhaust gases.

The ranges and limitations provided in the instant specification and claims are those which are believed to particularly point out and distinctly claim the instant invention. It is however, understood that other ranges and limitations that perform substantially the same function in substantially the same manner to obtain the same or substantially the same result are intended to be within the scope of the instant invention as defined by the instant specification and claims.

The present invention will now be illustrated by means of the following examples which are provided for illustration and are not to be construed as limiting the invention.

EXAMPLE

A mixture was prepared having the following composition:

| | | |
|---|---|---|
| silica-alumina (ex Crossfield, 25% w Al$_2$O$_3$) | 1040 g | (solids 800 g) |
| ethanolamine | 40 g | |
| water (demineralized) | 920 g | |

| | | |
|---|---|---|
| total | 2000 g | (LOI is 60%) |

The mixture was prepared by adding the ethanolamine and water to the silica-alumina and the mixture was kneaded for 45 min. The total kneaded mixture was extruded. The obtained extrudates (diameter 1.5 mm) were dried at 120° C. for 2 h, broken to pieces of about 4 to 5 mm and calcined at 500° C. for 2 h. The silica-alumina extrudate had the following properties:

BET surface area 379 m$^2$/g
pore volume 0.91 ml/g (mercury intrusion)
bulk crushing strength 0.62 MPa

We claim:

1. A process for the preparation of a shapable dough which comprises mixing and kneading a particulate silica-alumina with water and with an alkanolamine to obtain a mixture having a total solids content of from 25 to 60% by weight, the alkanolamine or being present in an amount of from 0.5 to 20% by weight on the total solids content of the mixture.

2. The process according to claim 1 wherein the silica-alumina is obtained by reacting a silicate with acid in the presence of an aluminium compound.

3. The process according to claim 2 wherein silica-alumina filter cake is used.

4. The process according to claim 1 wherein the total solids content is from 30 to 45% by weight.

5. The process according to claim 1 wherein the total solids content is from 35 to 40% by weight.

6. The process according to claim 1 wherein the alkanolamine or ammonia is present in an amount of from 3 to 10% by weight on the total solids content.

7. The process according to claim 1 wherein a polyelectrolyte is admixed into the mixture.

8. The process according to claim 1 wherein titanium dioxide or zirconium dioxide is admixed.

9. Shapable dough whenever prepared by means of a process according to any one of the claims 1-8.

10. A process for the preparation of silica-alumina extrudates from a shapable dough which comprises mixing and kneading a particulate silica-alumina with water and with an alkanolamine to obtain a mixture having a total solids content of from 25 to 60% by weight, the alkanolamine being present in an amount of from 0.5 to 20% by weight on the total solids content of the mixture and extruding the mixture.

11. Silica-alumina extrudates whenever prepared by means of a process according to claim 10.

12. The process for manufacturing calcined silica-alumina extrudates which comprises drying and calcining the silica-alumina extrudates according to claim 11, to a final temperature of between 300° C. and 1000° C.

13. Calcined silica-alumina extrudates whenever manufactured by means of a process according to claim 12.

* * * * *